US008659557B2

(12) United States Patent
Simmons et al.

(10) Patent No.: US 8,659,557 B2
(45) Date of Patent: Feb. 25, 2014

(54) TOUCH FINDING METHOD AND APPARATUS

(75) Inventors: Martin Simmons, Southampton (GB); David Pickett, Southampton (GB)

(73) Assignee: Atmel Corporation, San Jose, CA (US)

( * ) Notice: Subject to any disclaimer, the term of this patent is extended or adjusted under 35 U.S.C. 154(b) by 536 days.

(21) Appl. No.: 12/255,610

(22) Filed: Oct. 21, 2008

(65) Prior Publication Data

US 2010/0097328 A1    Apr. 22, 2010

(51) Int. Cl.
*G06F 3/041* (2006.01)

(52) U.S. Cl.
USPC .................................. 345/173; 178/18.03

(58) Field of Classification Search
USPC .................................. 345/173; 178/18.03
See application file for complete search history.

(56) References Cited

U.S. PATENT DOCUMENTS

| | | | |
|---|---|---|---|
| 5,463,388 A | 10/1995 | Boie et al. | |
| 5,825,352 A | 10/1998 | Bissett et al. | |
| 6,297,811 B1* | 10/2001 | Kent et al. ..................... | 345/173 |
| 6,452,514 B1 | 9/2002 | Philipp | |
| 6,888,536 B2 | 5/2005 | Westerman et al. | |
| 7,663,607 B2 | 2/2010 | Hotelling | |
| 7,782,307 B2* | 8/2010 | Westerman et al. .......... | 345/173 |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2005/0264541 A1* | 12/2005 | Satoh ............................ | 345/173 |
| 2006/0097991 A1 | 5/2006 | Hotelling | |
| 2006/0250377 A1 | 11/2006 | Zadesky et al. | |
| 2007/0070052 A1 | 3/2007 | Westerman | |

(Continued)

FOREIGN PATENT DOCUMENTS

| | | |
|---|---|---|
| CN | 1864124 A | 11/2006 |
| CN | 101078963 B | 12/2006 |

(Continued)

OTHER PUBLICATIONS

"International Application Serial No. PCT/GB2009/002508, Written Opinion mailed Dec. 1, 2010", 7 pgs.

(Continued)

*Primary Examiner* — Amare Mengistu
*Assistant Examiner* — Joseph G Rodriguez
(74) *Attorney, Agent, or Firm* — Baker Botts LLP

(57) ABSTRACT

A method of determining touches from a data set output from a touch screen comprising an array of sensing nodes. The method comprises analyzing the dataset and identifies a node with a maximum signal value among all unassigned nodes, and, if present, assigns that node to a touch. A logical test is applied to each node that is a neighbor to the assigned node to determine if that node should also be assigned to the touch and the logical test is repeatedly applied to the unassigned neighbors of each newly assigned node until there are no more newly assigned nodes, or no more unassigned nodes, thereby assigning a group of nodes to the touch defining its area. This process can be repeated until all of the nodes of a touch panel are assigned to a touch. The method is ideally suited to implementation on a microcontroller. Therefore, although the kind of processing power being considered is extremely modest in the context of a microprocessor or digital signal processor, it is not insignificant for a microcontroller, or other low specification item, which has memory as well as processing constraints.

14 Claims, 7 Drawing Sheets

(56) References Cited

U.S. PATENT DOCUMENTS

| | | |
|---|---|---|
| 2007/0152979 A1 | 7/2007 | Jobs et al. |
| 2007/0152984 A1 | 7/2007 | Ording et al. |
| 2007/0177804 A1 | 8/2007 | Elias et al. |
| 2007/0257890 A1 | 11/2007 | Hotelling et al. |
| 2008/0042988 A1 | 2/2008 | Westerman |
| 2008/0165141 A1 | 7/2008 | Christie |
| 2008/0246496 A1 | 10/2008 | Hristov et al. |
| 2009/0095540 A1* | 4/2009 | Zachut et al. ............ 178/18.03 |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

FOREIGN PATENT DOCUMENTS

| | | |
|---|---|---|
| WO | 00/44018 A1 | 7/2000 |
| WO | WO-2006023569 A1 | 2/2006 |
| WO | WO-2007146785 A2 | 12/2007 |
| WO | WO-2009140347 A2 | 11/2009 |
| WO | WO 2012/129247 | 9/2012 |

OTHER PUBLICATIONS

"International Application Serial No. PCT/GB2009/002508, Search Report mailed Dec. 1, 2010", 4 pgs.

Sk, Lee, "A multi-touch three-dimensional touch-sensitive tablet", CHI '85 Proceedings of the SIGCHI Conference on Human Factors in Computing Systems, (Apr. 1, 1985), 21-25.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

First Office Action, Translation, with Search Report of China State Intellectual Property Office regarding Application No. 2009/80141961.1; ref. 2013053100988920, Jun. 5, 2013.

* cited by examiner

TOUCH FINDING METHOD AND APPARATUS

BACKGROUND OF THE INVENTION

The invention relates to a method and apparatus for locating touches on a touch sensor.

Two-dimensional (2D) touch screens, regardless of which technology is used, generally have a construction based on a matrix of sensor nodes that form a 2D array in Cartesian coordinates, i.e. a grid.

In a capacitive sensor, for example, each node is checked at each sampling interval to obtain the signal at that node, or in practice signal change from a predetermined background level. These signals are then compared against a predetermined threshold, and those above threshold are deemed to have been touched and are used as a basis for further numerical processing.

The simplest situation for such a touch screen is that a touch is detected by a signal that occurs solely at a single node on the matrix. This situation will occur when the size of the actuating element is small in relation to the distance between nodes. This might occur in practice when a stylus is used. Another example might be when a low resolution panel for finger sensing is provided, for example a 4×4 key matrix.

Often the situation is not so simple, and a signal arising from a touch will generate significant signal at a plurality of nodes on the matrix, these nodes forming a contiguous group. This situation will occur when the size of the actuating element is large in relation to the distance between nodes. In practice, this is a typical scenario when a relatively high resolution touch screen is actuated by a human finger (or thumb), since the finger touch will extend over multiple nodes.

For an increasing number of applications it is also necessary for the touch screen to be able to detect multiple simultaneous touches, so-called multitouch detection. For example, it is often required for the touch screen to be able to detect gestures, such as a pinching motion between thumb and forefinger. The above techniques can be extended to cater for multitouch detection.

An important initial task of the data processing is to process the raw data sets from each sampling interval to identify how many touches have occurred, and where. In particular, if a user makes two touches simultaneously, the device should be able to recognize this and not mistakenly identify the input as being only one touch. The converse is also true. To carry out this processing reliably, rapidly and with low memory and processing power, is not necessarily straightforward. A particular problem area is when multiple simultaneous touches are close together.

U.S. Pat. No. 5,825,352 [1] discloses an approach to identify multiple simultaneous touches from the raw signal level data output from a touch screen.

FIG. 1 illustrates this approach in a schematic fashion. In this example interpolation is used to create a curve in x, f(x), and another curve in y, f(y), with the respective curves mapping the variation in signal strength along each axis. Each detected peak is then defined to be a touch at that location. In the illustrated example, there are two peaks in x and one in y, resulting in an output of two touches at (x1, y1) and (x2, y2). As the example shows, this approach inherently caters for multitouch as well as single touch detection. The multiple touches are distinguished based on the detection of a minimum between two maxima in the x profile. This approach is well suited to high resolution screens, but requires considerable processing power and memory to implement.

This is undesirable in many high volume commercial applications. For example, for consumer products, where cost is an important factor, it is desirable to implement the touch detection processing in low complexity hardware, in particular microcontrollers. Therefore, although the kind of processing power being considered is extremely modest in the context of a microprocessor or digital signal processor, it is not insignificant for a microcontroller, or other low specification item, which has memory as well as processing constraints.

SUMMARY OF THE INVENTION

According to the invention there is provided a method of determining touches from a data set output from a touch screen comprising an array of sensing nodes, the method comprising:

a) identifying a node with a maximum signal value among all unassigned nodes, and, if present, b) assigning that node to a touch, c) applying a logical test to each node that is a neighbor to the assigned node to determine if that node should also be assigned to the touch, and d) repeatedly applying the logical test to the unassigned neighbors of each newly assigned node until there are no more newly assigned nodes, or no more unassigned nodes, thereby assigning a group of nodes to the touch defining its area.

In this way the area of the touch is determined, not just its location. The area of a touch provides useful information for higher level processing. For example, it can be used to compute more accurately the location of each touch, i.e. the x, y coordinates, rather than simply assuming the touch location is at the maximum signal value.

Moreover, the strength of a touch can be quantified by summing the signal values of the group of nodes.

One or both of these factors may also be used to distinguish between different types of input, e.g. to distinguish how hard a touch is being made, whether a touch is from the end of a finger, the pad of a finger, the pad of a thumb, which hand the digit is from and so forth, all of which can be useful, for example for tracking motion of touches, and for gesture recognition.

The method may further comprise repeating steps a), b), c) and d) as many times as is required until no node with a maximum signal value is identified, whereupon all touches have been identified and assigned respective groups of nodes defining their area.

The method can thereby identify all touches that are present in the available data set for each frame, whether there are no touches, one touch, two touches or whatever higher number.

The method may further comprise repeating steps a), b), c) and d) up to a fixed number of times or until no node with a maximum signal value is identified, whereafter up to the fixed number of touches have been identified and assigned respective groups of nodes defining their area.

It may be beneficial to cap the number of touches being sought in this way, for example to 1, 2, 3 or 4. For example, if none of the higher level processing for gesture detection or other tasks cater for more than, for example, 4 simultaneous touches, there is no benefit in repeating the method of the invention beyond the fourth touch, since this would be wasted processing. Moreover, the data collection mode can be flexibly varied by varying the fixed number depending on what application, or what part of an application, is being run on the device to which the touch screen provides input. Namely, some applications will only need single touch inputs, whereas others will expect multitouch inputs, often with a fixed maximum number of simultaneous touches.

As is probably self evident, the method is easily programmed and is scalable with matrix size, which is important given the industry trend towards higher and higher numbers of nodes in the matrix.

Perhaps a more subtle point, which may only become clear after reading the detailed description further below, is that the method of the invention automatically caters for touches that are close to each other, since it is not necessary to assign each node to only one touch, which often produces inaccurate results and causes complexity in the programming. Rather a node can be shared between two or more touches without difficulty. This is a key advantage for multitouch sensing, since it automatically satisfies one of the more challenging requirements in multitouch processing, which is how to distinguish one large-area touch from two (or more) small-area touches that are close together. In particular, there is no need to perform numeric processing to identify a minimum between two maxima to distinguish a two-touch situation from a one-touch situation.

The logical test may be implemented in a variety of forms. In the preferred embodiments the method is implemented such that the logical test involves testing whether the as yet unassigned neighbor node has a signal value lower than that of the assigned node it is being compared with, and if yes provisionally deciding that the as yet unassigned neighbor node is to be assigned to the touch being processed, subject to outcomes of optional other parts of the logical test. Reference to 'lower than' is understood to include the equivalent option of 'lower than or equal to'.

The method is preferably implemented such that the logical test additionally involves testing whether the as yet unassigned neighbor node has a signal value greater than a saturation threshold value, and if yes deciding that the as yet unassigned neighbor node is to be assigned to the touch being processed. Reference to 'greater than' is understood to include the equivalent option of 'greater than or equal to'.

The method is preferably implemented such that the saturation threshold value is set at a level determined from a pre-calibrated measure of saturation levels for the touch screen.

The method is preferably implemented such that the saturation threshold value is set for each touch at a level having regard to the maximum signal value for the touch being processed.

The method is preferably implemented such that the logical test additionally involves testing whether the as yet unassigned neighbor node has a signal value lower than a detect threshold, and if yes deciding that the as yet unassigned neighbor node is not to be assigned to the touch being processed. Reference to 'lower than' is understood to include the equivalent option of 'lower than or equal to'.

The method is preferably implemented such that prior to step a) all nodes having signal values lower than a detect threshold are tagged so as to be ignored by subsequent processing to assign nodes to touches, thereby to remain unassigned throughout. Reference to 'lower than' is understood to include the equivalent option of 'lower than or equal to'.

The method is preferably implemented such that the touch screen is a capacitive touch screen.

The invention also relates to 2D touch-sensitive position sensor comprising: a touch panel having a plurality of sensing nodes or elements distributed over its area to form an array of sensing nodes, each of which being configured to collect a location specific sense signal indicative of a touch, a measurement circuit connected to the sensing elements and operable repeatedly to acquire a set of signal values, each set being made up of a signal value from each of the nodes, and a processor connected to receive the sets of signal values and operable to process each set to output touch data providing information on each touch, the processor being configured to process each set according to the method of the invention.

In a preferred embodiment, processing commences by identifying the node with the highest signal. This is the starting node. The 8 directly neighboring nodes (assuming a Cartesian 2D grid) are then assessed to establish whether they "belong" to the same touch as the starting node. If the signal on a direct neighbor node is less than or equal to the signal on the starting node, then that direct neighbor node is defined as belonging to the same touch as the one that actuated the starting node. We refer to this direct neighbor node as having been assigned to the same touch as the starting node. This is repeated for all direct neighbor nodes.

The process is then repeated taking each assigned direct neighbor node in the previous step as a new starting node, and testing whether the unassigned nodes directly neighboring it should be assigned to the same touch. The starting nodes based on the direct neighbors to the original starting node, are called secondary starting nodes, and the original starting node is called a primary node in the following.

This recursive process is repeated through tertiary, quaternary, quinary and so forth starting nodes until no new starting nodes are identified. The result will be a contiguous group of nodes assigned to one touch.

If the device is configured to cater for the possibility of multiple simultaneous touches in one sample, as is preferred, the unassigned node with the highest signal is then selected as a second starting node, and the process described above is repeated until all nodes that should be assigned to the second starting node are assigned to it.

The process can then repeat again to identify the unassigned node with the highest signal, i.e. the node with the highest signal from among all nodes that are not assigned to the previously processed touches.

The process will finally terminate when all nodes have been assigned.

By physical analogy, determination of the extent of a touch may be considered to be performed by a nucleation process around nucleation sites, where the nucleation sites are the starting nodes.

The method is preferably performed only on those nodes that have a signal above a predetermined threshold. All nodes with signals below the threshold are ignored from consideration. This avoids unnecessary processing of signals close to the noise level. This is most easily achieved in a pre-processing step in which nodes having signals below threshold are set to zero, or some value to indicate that they are not significant. In the processing all the below threshold nodes can for example be pre-assigned as belonging to a null touch, so they are ignored by the subsequent processing of 'real' touches. An alternative way of dealing with below threshold nodes is within the recursive processing of the 'real' touches, in which a node is only ever assigned to a touch if it has a signal value above threshold.

Another improvement on the basic method which has been found to be useful in practice is to modify the test for assigned nodes to take account of the fact that the node signals will tend to have a saturation level. Consequently, if there is a large-area touch, many of the nodes will have signals at around the saturation level. In such situations, the basic method prematurely terminates, thereby indicating a smaller touch area than it should. In other words, the basic method implicitly assumes a single humped distribution, whereas a large area saturated touch will be characterized by a plateaus of saturated signal values which go up and down by small amounts over several nodes.

The improvement therefore consists of automatically assigning a neighbor node if it has a signal level that is within a certain level of the signal level of the primary starting node, e.g. within 10% or equivalent rounded discrete value. Such a node is assigned to the touch regardless of whether that node satisfies the test of the basic method, i.e. regardless of whether it has a signal less than or equal to the signal on the starting node. Effectively a dynamic threshold is being set based on the signal of the primary starting node.

An alternative way of achieving the same effect is automatically to assign a neighbor node if it has a signal level that is above a saturation threshold which is set sufficiently low to capture substantially all signal readings that are from saturated sensors. This may be considered to be a static threshold setting approach.

The ability to detect very large area touches as is made possible by this improvement is important, since a very large area touch is often indicative of input which should be ignored. For example, if a user holds or grips a device incorporating a touch sensor, and the grip extends over a substantial portion of the touch sensor area, for example a mobile telephone, it is important to be able to recognize this and suppress processing of signals from the touch screen. We refer to this useful function as "grip suppression".

The invention may be implemented in varied forms as will be appreciated by a person skilled in the art.

For example, there are potentially many variations on the logical test to be applied to assign nodes to touches.

In particular, it will be appreciated that references to 'less than' or 'more than' are in most cases functionally equivalent to 'less than or equal to' or 'more than or equal to' given that the signal values are scalar quantities. In the case that the signal values are integer scalar quantities it may be important in the detailed implementation to be accurate in respect of whether the test is 'less than' or 'less than or equal to', but there is no difference in principle. In other cases, where the scalar quantities have high resolution values, e.g. the sensing node outputs are analog and supplied for digital processing through an analog-to-digital converter, then there will be no difference in practice.

In the following detailed description, capacitive sensing examples will be used, but the skilled person will understand that the method of the invention is applicable to any 2D position sensing technology that outputs raw data sets from its sensing surface of the kind described herein, for example resistive, total internal reflection, ultrasonic, surface acoustic wave and other devices.

BRIEF DESCRIPTION OF THE DRAWINGS

For a better understanding of the invention, and to show how the same may be carried into effect, reference is now made by way of example to the accompanying drawings, in which.

DETAILED DESCRIPTION

Figure 1:
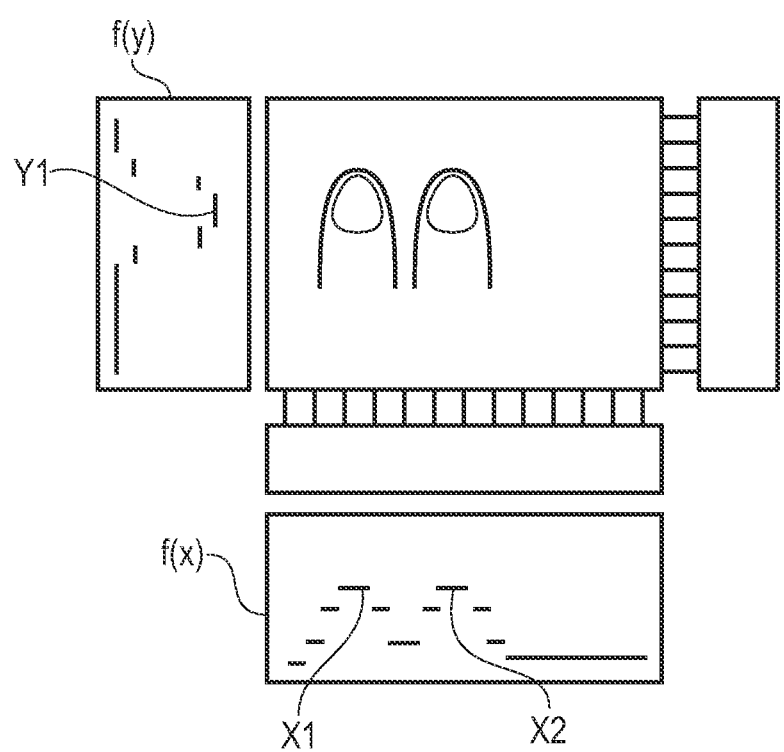
FIG. 1 is schematically shows a prior art approach to identifying multiple touches on a touch panel.
Figure 2:
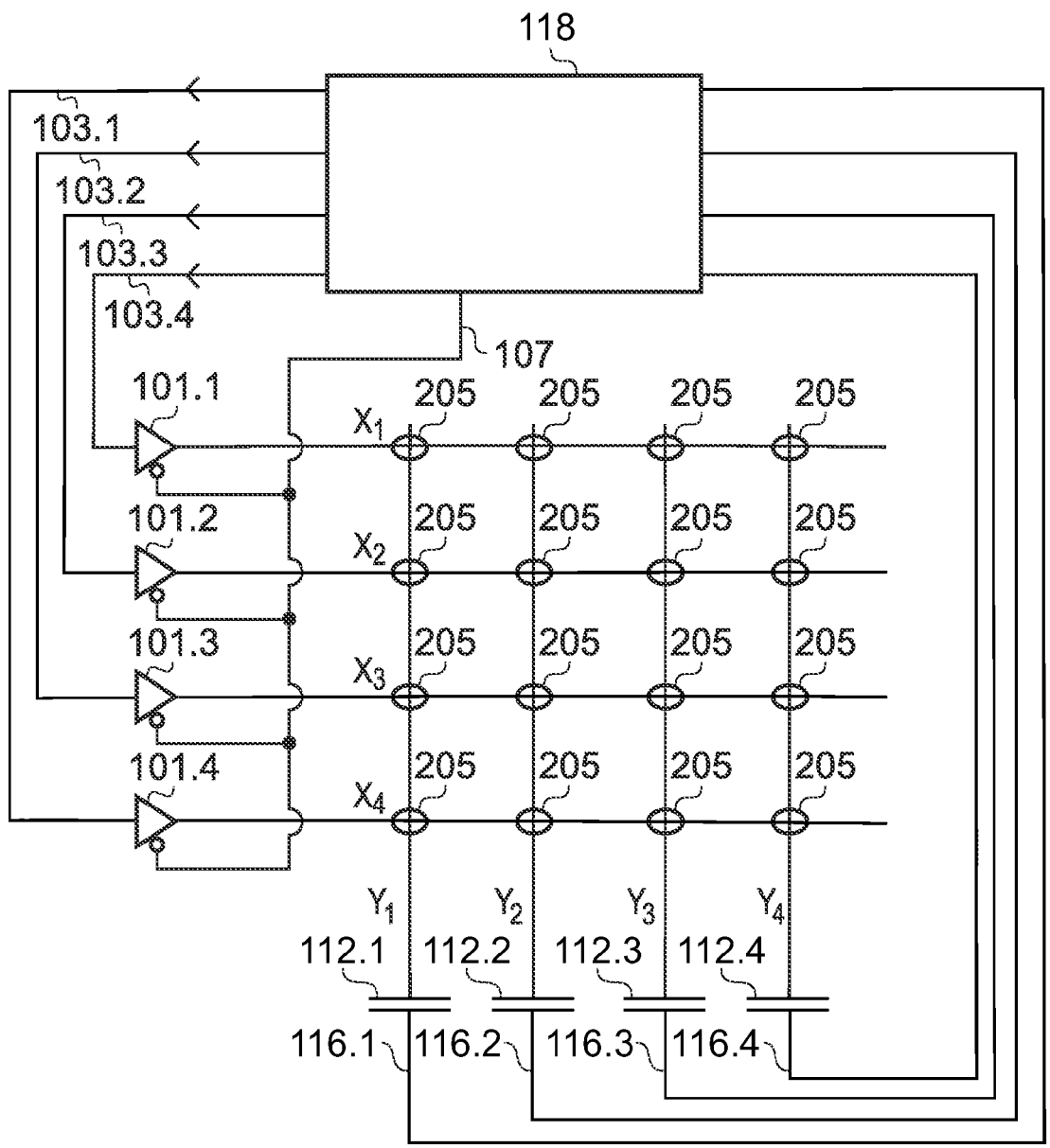
FIG. 2 schematically shows in plan view a 2D touch-sensitive capacitive position sensor and associated hardware of a first embodiment of the invention.

FIG. 2 is a circuit diagram illustrating a touch sensitive matrix providing a two-dimensional capacitive transducing sensor arrangement according to an embodiment of the invention. The touch panel shown in FIG. 1 comprises three column electrodes and five row electrodes, whereas that of FIG. 2 has a 4×4 array. It will be appreciated that the number of columns and rows may be chosen as desired, another example being twelve columns and eight rows or any other practical number of columns and rows.

The array of sensing nodes is accommodated in or under a substrate, such as a glass panel, by extending suitably shaped and dimensioned electrodes. The sensing electrodes define a sensing area within which the position of an object (e.g. a finger or stylus) to the sensor may be determined. For applications in which the sensor overlies a display, such as a liquid crystal display (LCD), the substrate may be of a transparent plastic material and the electrodes are formed from a transparent film of Indium Tin Oxide (ITO) deposited on the substrate using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

There is considerable design freedom in respect of the pattern of the sensing electrodes on the substrate. All that is important is that they divide the sensing area into an array (grid) of sensing cells arranged into rows and columns. (It is noted that the terms "row" and "column" are used here to conveniently distinguish between two directions and should not be interpreted to imply either a vertical or a horizontal orientation.) Some example electrode patterns are disclosed in US 2008/0246496 A1 [6] for example, the contents of which are incorporated in their entirety.

It will be recognized by the skilled reader that the sensor illustrated in FIG. 2 is of the active type, i.e. based on measuring the capacitive coupling between two electrodes (rather than between a single sensing electrode and a system ground). The principles underlying active capacitive sensing techniques are described in U.S. Pat. No. 6,452,514 [4]. In an active-type sensor, one electrode, the so called drive electrode, is supplied with an oscillating drive signal. The degree of capacitive coupling of the drive signal to the sense electrode is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background or quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

The illustrated m×n array is a 4×4 array comprising 4 drive lines, referred to as X lines in the following, and four sense lines, referred to as Y lines in the following. Where the X and Y lines cross-over in the illustration there is a sensing node 205. In reality the X and Y lines are on different layers of the touch panel separated by a dielectric, so that they are capacitively coupled, i.e. not in ohmic contact. At each node 205, a capacitance is formed between adjacent portions of the X and Y lines, this capacitance usually being referred to as $C_E$ or $C_x$ in the art, effectively being a coupling capacitor. The presence of an actuating body, such as a finger or stylus, has the effect of introducing shunting capacitances which are then grounded via the body by an equivalent grounding capacitor to ground or earth. Thus the presence of the body affects the amount of charge transferred from the Y side of the coupling capacitor and therefore provides a way of detecting the presence of the body. This is because the capacitance between the X and Y "plates" of each sensing node reduces as the grounding capacitances caused by a touch increase. This is well known in the art.

In use, each of the X lines is driven in turn to acquire a full frame of data from the sensor array. To do this, a controller 118 actuates the drive circuits 101.1, 101.2, 101.3, 101.4 via control lines 103.1, 103.2, 103.3 and 103.4 to drive each of the X lines in turn. A further control line 107 to the drive circuits provides an output enable to float the output to the X plate of the relevant X line.

For each X line, charge is transferred to a respective charge measurement capacitor Cs 112.1, 112.2, 112.3, 112.4 connected to respective ones of the Y lines. The transfer of charge from the coupling capacitors 205 to the charge measurement capacitors Cs takes place under the action of switches that are controlled by the controller. For simplicity neither the switches or their control lines are illustrated. Further details can be found in U.S. Pat. No. 6,452,514 [4] and WO-00/44018 [5].

The charge held on the charge measurement capacitor Cs 112.1, 112.2, 112.3, 112.4 is measurable by the controller 118 via respective connection lines 116.1, 116.2, 116.3, 116.4 through an analog to digital converter (not shown) internal to the controller 118.

More details for the operation of such a matrix circuit are disclosed in U.S. Pat. No. 6,452,514 [4] and WO-00/44018 [5].

The controller operates as explained above to detect the presence of an object above one of the matrix of keys 205, from a change in the capacitance of the keys, through a change in an amount of charge induced on the key during a burst of measurement cycles. However, the presence of a noise signal can induce charge onto the keys of a touch sensor and provide a false detection or prevent a detection being made.

The controller is operable to compute the number of simultaneous touches on the position sensor and to assign the discrete keys to one of the simultaneous touches using the algorithm described above with reference to FIGS. 3A-B, 4A-B, 5A-B and 6. The discrete keys assigned to each of the touches are output from the controller to a higher level system component on an output connection. Alternatively, the host controller will interpolate each of the nodes assigned to each of the touches to obtain the coordinates of the touch. The numerical approach used to interpolate the touch coordinates may be to perform a centre of mass calculation on the signals from all nodes that are assigned to each touch, similar to that disclosed in US 2006/0097991 [3].

The controller may be a single logic device such as a microcontroller. The microcontroller may preferably have a push-pull type CMOS pin structure, and an input which can be made to act as a voltage comparator. Most common microcontroller I/O ports are capable of this, as they have a relatively fixed input threshold voltage as well as nearly ideal MOSFET switches. The necessary functions may be provided by a single general purpose programmable microprocessor, microcontroller or other integrated chip, for example a field programmable gate array (FPGA) or application specific integrated chip (ASIC).

Figure 3A:
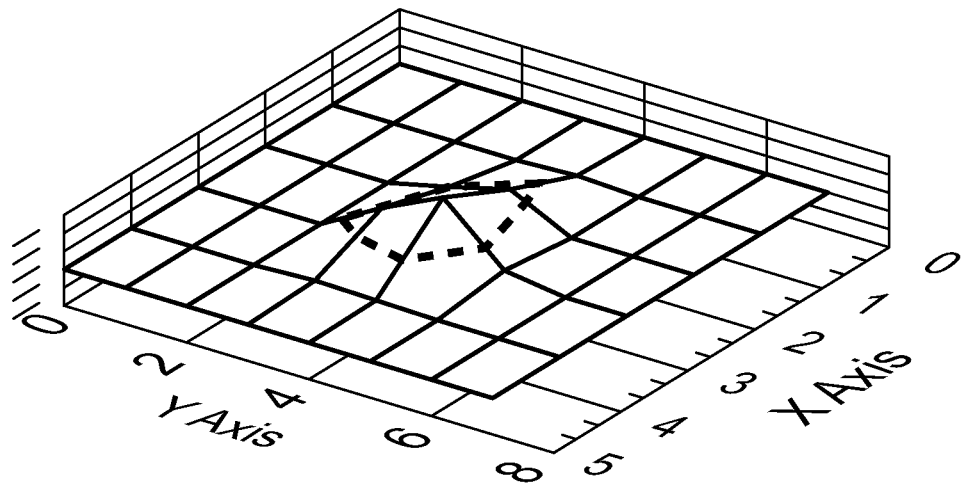
FIG. 3A-B illustrates an example output data set from the a touch panel similar to that shown in FIG. 2 with a signal touch.

FIG. 3A shows a typical plot of data from a 2D touch panel that could be output from the processor 208 of FIG. 2. The touch panel shown in FIG. 2 only comprises a 4×4 touch panel. However, it will be appreciated that this can be extended to an 8×6 touch panel, as shown in FIG. 3A or any other size.

The plot shown in FIG. 3A shows the signal level at each of the discrete keys or nodes which are located at the intersection of the x- and y-conducting lines at every intersection of the x and y conducting lines. For the purposes of the foregoing the intersections at each of the x and y conducting wires will be referred to as nodes.

Figure 3B:
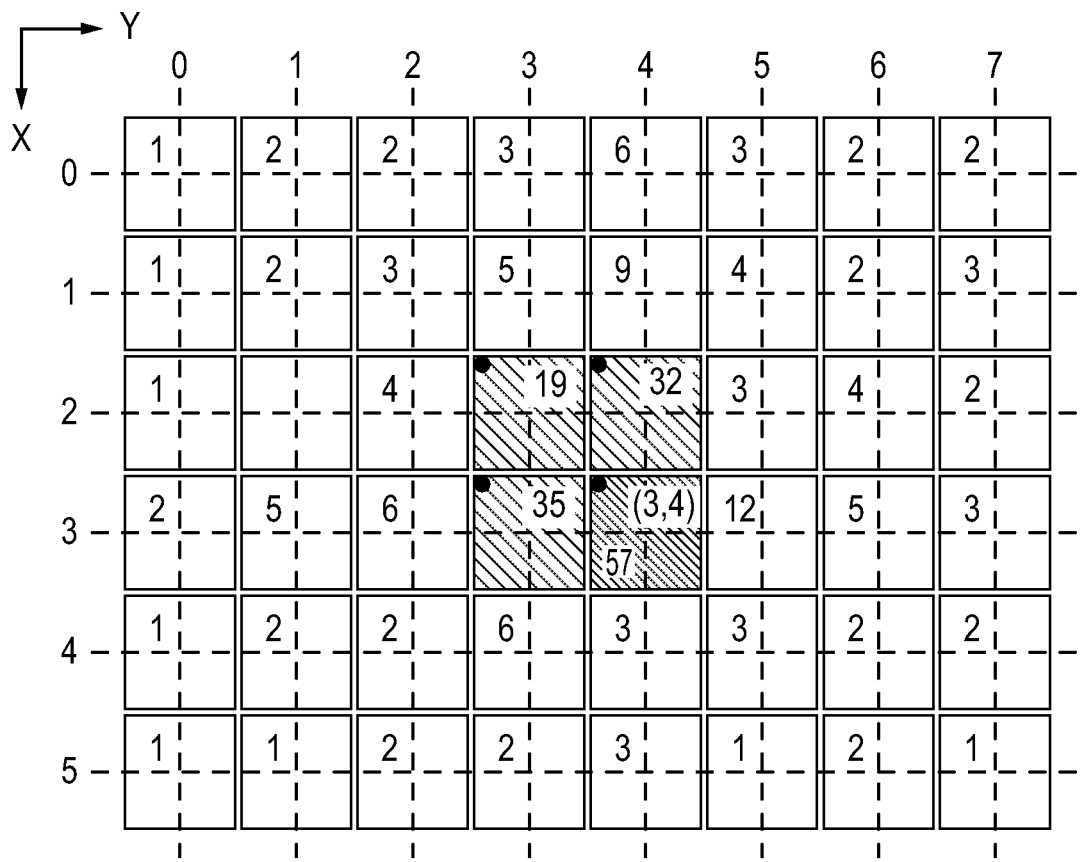
Figure 4A:
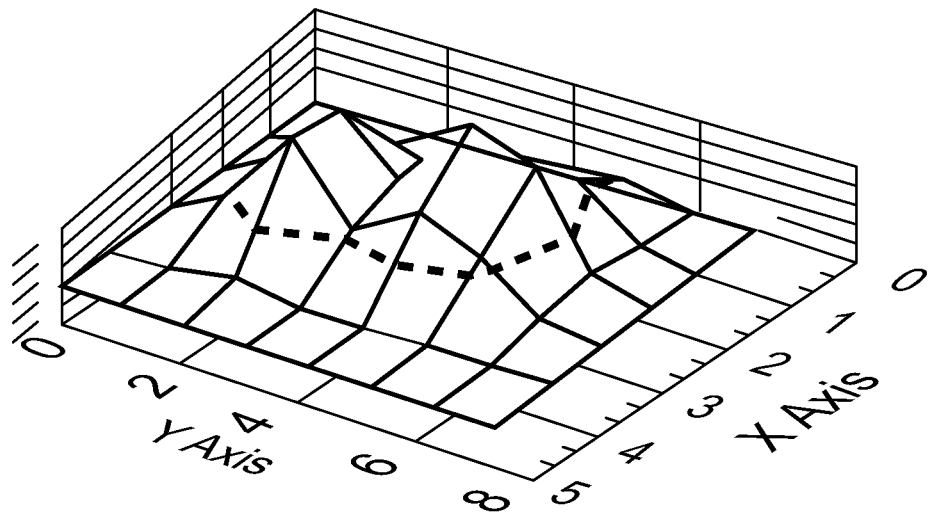
FIG. 4A-B illustrates an example output data set from the a touch panel similar to that shown in FIG. 2 with two touches.
Figure 4B:
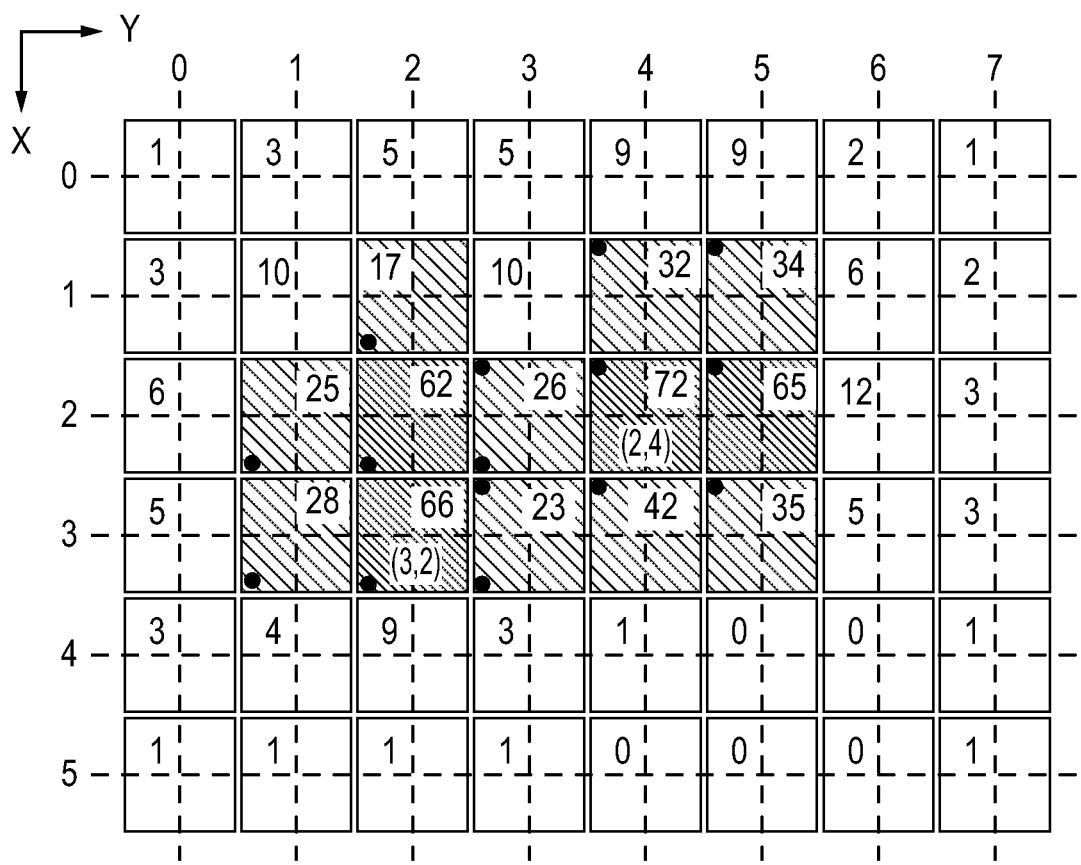

FIG. 3B shows the signal data from FIG. 3A as a two dimensional layout. The numbers in each of the squares in FIG. 3B represent the signal values at each intersection of the x and y conducting lines or wires, i.e. at each sensing node. In addition, circles in the top left corner of each node area denote nodes of this touch that are in detect, i.e. have an above-threshold signal value, where the threshold is 12 in these examples, 13 being in detect and 12 being out of detect. In detect nodes are also shaded with oblique hatching for keys up to a certain signal value, which is 50, and with cross-hatching for the single node above 50. The node with the largest signal value, which is 57, is also labeled with its coordinates, which are (3, 4). The x and y conducting lines are indicated by the vertical and horizontal dotted lines respectively in FIG. 3B. There are six x-electrodes labeled 0-5 and eight y-electrodes labeled 0-7, the orientation of which are shown towards the top left of the drawing in FIG. 3B FIGS. 4A and 4B show similar touch data to that shown in FIGS. 3A-B but with two simultaneous touches. The signal values are indicated, and in detect nodes shaded, as before. In addition, the convention of placing circles in the corner of in detect nodes is extended, whereby in detect nodes associated with a first touch have circles in the top left corner as before, and those of the second touch have circles placed in the bottom left corner. As can be seen, two of the nodes—the ones at (3, 2) and (3, 3)—are shared, i.e. are part of both touches. The nodes of each touch with the largest signal value are also labeled with their coordinates.

Figure 5A:
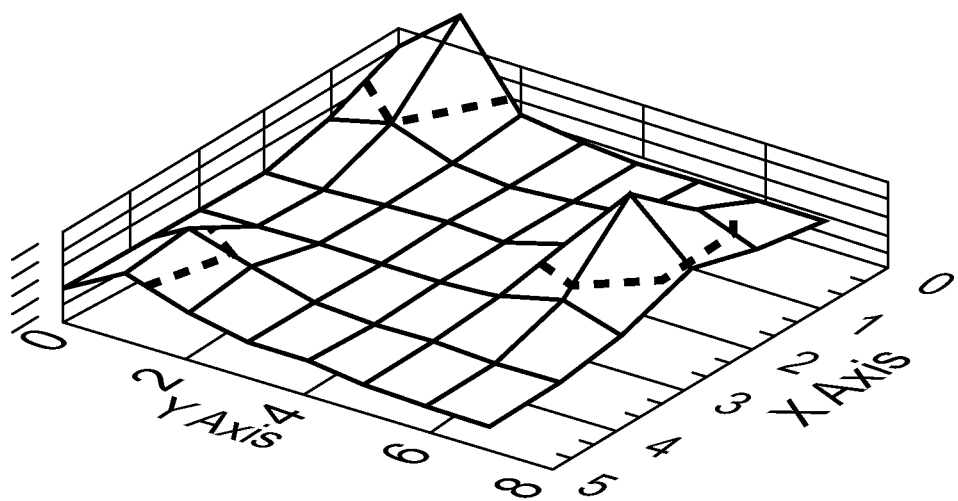
FIG. 5A-B illustrates an example output data set from the a touch panel similar to that shown in FIG. 2 with three touches.
Figure 5B:
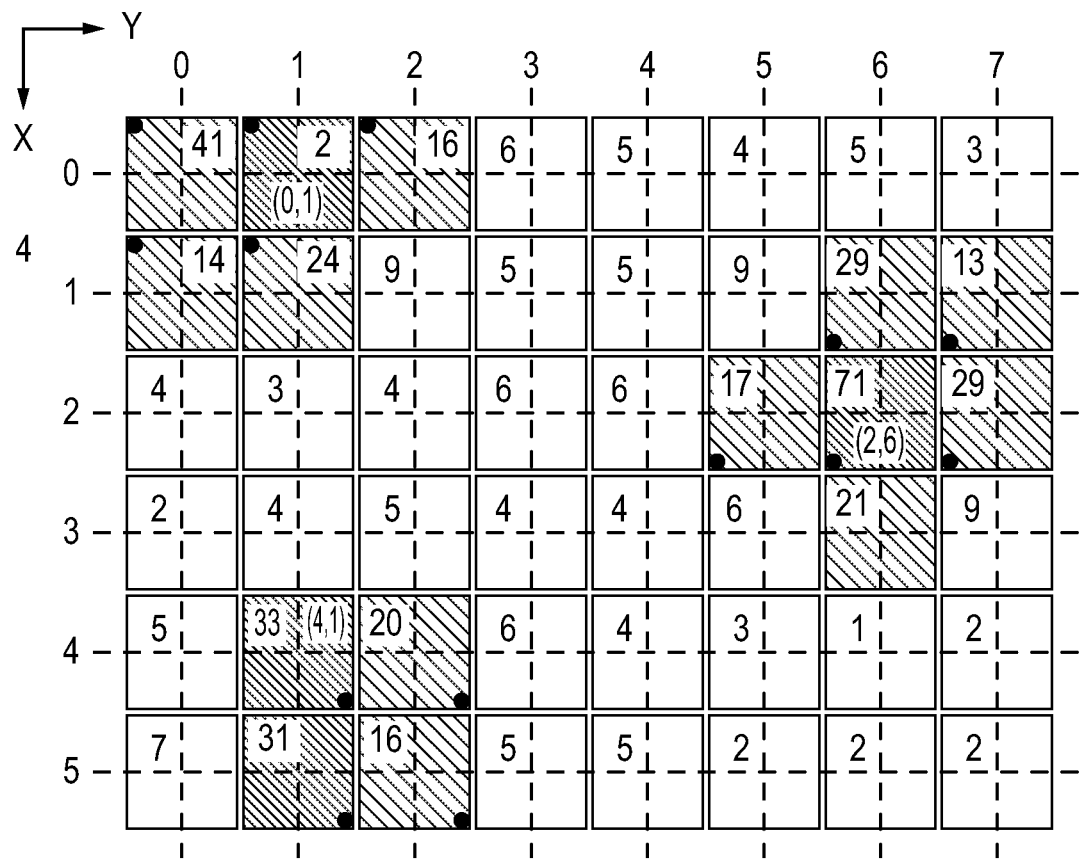

FIGS. 5A and 5B show example touch data with 3 simultaneous touches. The same labeling conventions are used as before. In addition, the convention of placing circles in the corner of in detect nodes is extended so the first, second and third touches are indicated with circles in the top left, bottom left and bottom right corners respectively.

Figure 6:
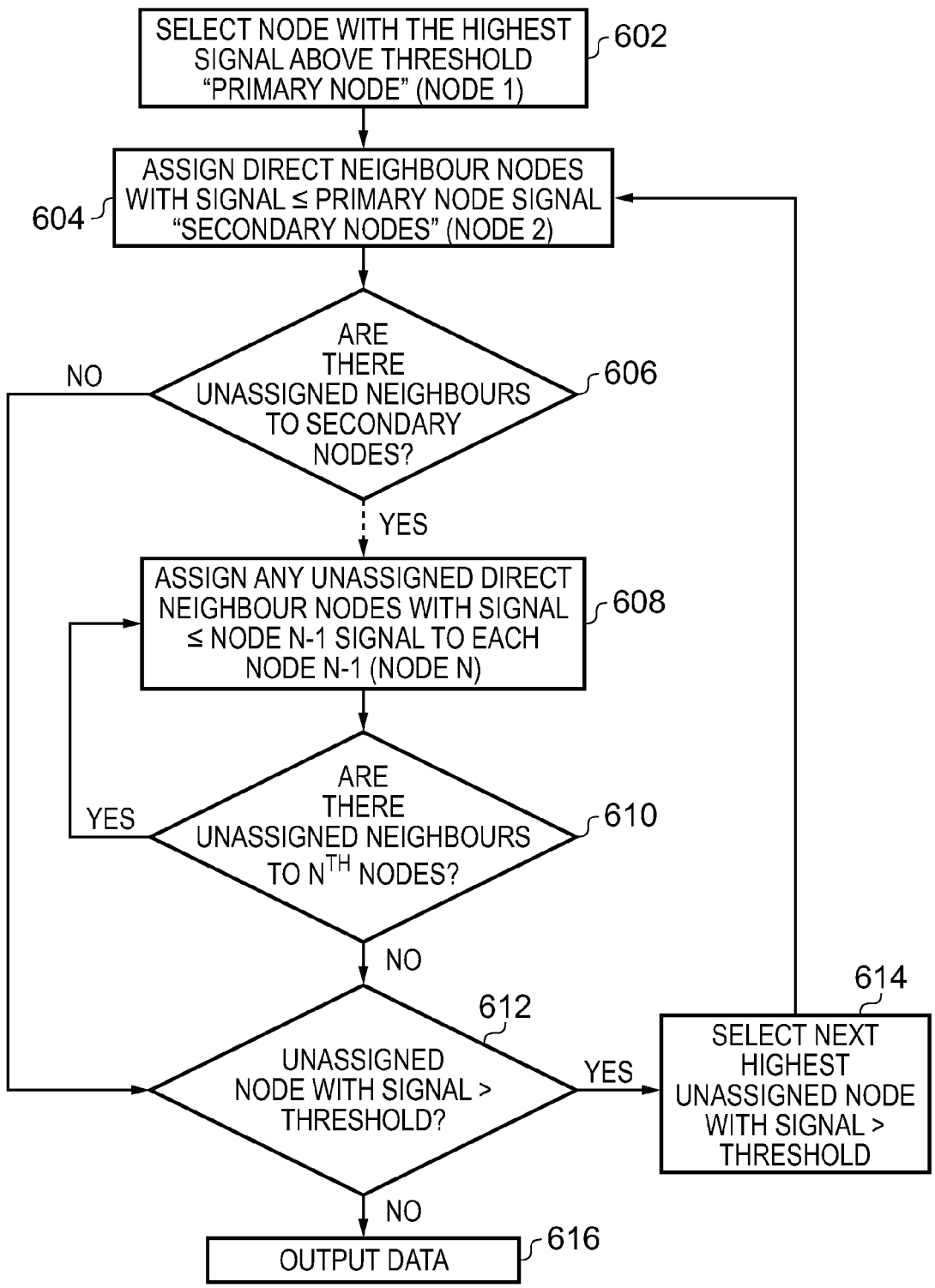
FIG. 6 is a flow diagram showing the method for assigning nodes to a one or more touches adjacent a touch panel.

FIG. 6 shows a flow chart of the method used to assign discrete keys or nodes to one or more touches located on a touch panel according to an embodiment of the invention. The flow chart shown in FIG. 6 will be used in conjunction with FIGS. 3A-B, 4A-B and 5A-B to illustrate how the signal values of each of the nodes are used to identify which of the nodes are assigned to one or more touches.

In a pre-processing step not shown in the flow chart in FIG. 6, the signal of each of the nodes is compared to a threshold signal value. Any node that has a signal value that is less then the threshold value will not be considered in the following algorithm. This is the preferred method of the invention. Alternatively the comparison to a threshold could be carried out during the algorithm. In the alternative method, before the node is assigned to a particular touch it is compared to a threshold signal level. Using either method, if the signal value is less than the threshold signal value the node will be as assigned to a null touch. A "null touch" is taken to mean no touch, such that the node will not be considered in any subsequent steps of the algorithm, since it is assigned.

For the purposes of the following description it will be assumed that the signals are compared to a threshold before applying the algorithm. The threshold is taken to be 13. Therefore, each of the node signals shown in FIG. 3B are compared to the threshold of 13 and those that are greater than or equal to the threshold are shaded. The other detected nodes with signals less than the threshold are assigned to a null touch.

In step 602, the node with the highest signal that is not assigned to a touch is selected. In FIG. 3B the node with the highest signal is located at coordinate (3, 4). The first selected node is referred to as the primary or start node.

In step 604, the signals of each of the direct neighbors to the selected node at coordinate (3, 4), that are not already assigned, are compared to the signal of the selected node or the primary node. In the example shown in FIG. 3B, there are 8 direct neighbor nodes. If the signal of the direct neighbor node is less than or equal to the selected node's (primary node) signal, then the direct neighboring node is assigned to the selected node or primary node. This is interpreted to mean that nodes that are assigned to another node form a single touch. In the example shown in FIG. 3A the nodes at coordinates (2, 3), (2, 4) and (3, 3) are all assigned to the selected or primary node at coordinate (3, 4). These are referred to as secondary nodes. All of the other neighboring nodes are already assigned to a null touch in the pre-processing step described above.

In step 606, the assigned status of each of the direct neighbors of each of the secondary nodes is identified. Each of the secondary nodes are now starting nodes. If there are no unassigned direct neighbor nodes to any of the secondary nodes, then the process goes to step 612. In the example shown in FIG. 3B all the neighbor nodes of the secondary nodes are either assigned to the primary node or a null touch. Therefore, for the example shown in FIG. 3B the process goes to step 612. However, if there are unassigned direct neighbor nodes to any of the secondary nodes, the signals of each of these are compared to the signal values of the secondary node that they are direct neighbors with. This process is repeated for each of the secondary nodes, until there are no more unassigned nodes that are direct neighbors to the each of the secondary nodes. If any of the direct neighbor nodes have a signal less than or equal to the signal of the secondary node, the node is assigned to the same touch. These nodes are referred to as tertiary nodes. The process shown in steps 608 and 610 are repeated through quaternary, quinary and so forth starting nodes until there are no unassigned nodes that fulfill the requirement of having a signal value less than or equal to the signal value of its direct neighbor starting node. In other words the steps 608 and 610 are repeated until there are no longer any new assigned starting nodes.

In step 612, the nodes are searched for any unassigned nodes having a signal greater than or equal to the threshold.

In step 614, the highest unassigned node is selected and the process in steps 604 to 612 is repeated.

In step 616, the data is output in the form of one or more contiguous groups of nodes assigned to each touch. In the example shown in FIG. 3B, there is a single touch. Therefore, the nodes identified above are form a single touch, that is output in the form of one contiguous group of nodes assigned to touch T1, as shown in Table 1.

TABLE 1

| | | Node coordinates | |
|---|---|---|---|
| Touch | Primary | Secondary | |
| T1 | (3, 4) | (2, 3), (2, 4), (3, 3) | |

FIGS. 4A-B will be used in conjunction with the algorithm shown in FIG. 6, to show how nodes on a touch panel are assigned to multiple touches.

FIG. 4B shows the signal data from FIG. 4A as a two dimensional layout. The numbers in each of the squares in FIG. 4B represent the signal values at each intersection of the x and y conducting lines, i.e. at each sensing node. The x and y conducting lines are indicated by the vertical and horizontal dotted lines respectively in FIG. 4B. There are six x-electrodes labeled 0-5 and eight y-electrodes labeled 0-7, the orientation of which are shown towards the top left of the drawing in FIG. 4B The pre-processing step is applied to each of the nodes shown in FIG. 4A. The signal from each of the nodes is compared to a threshold of 13. The nodes having a signal value greater than or equal to 13 are shaded. All the other nodes are assigned to a null touch.

The signal values of the unassigned nodes are searched for the node with the highest signal value. The unassigned node with the highest signal value is the node at coordinate (2, 4) with a signal value of 72. This is the primary or stating node for this touch. The touch whose starting node is at coordinate (2, 4) will be referred to as T1.

The signal value of each of the unassigned nodes that are direct neighbors of the primary node of T1, are compared to the signal value of the primary node. Nodes at coordinates (1, 4), (1, 5), (2, 3), (2, 5), (3, 3), (3, 4) and (3, 5) all have signal values that are less then or equal to the signal value of the primary node. Therefore, nodes at coordinates (1, 4), (1, 5), (2, 3), (2, 5), (3, 3), (3, 4) and (3, 5), referred to as secondary nodes, are assigned to the primary nodes and thus to the touch T1.

The process is now repeated for each of the secondary nodes. In FIG. 4B secondary nodes at coordinates (2, 3) and (3, 3) are the only nodes that have direct neighbor nodes that are unassigned. Taking the node at coordinate (2, 3), the signal value of each its direct neighbor nodes that are unassigned is compared to the signal value of the secondary node at coordinate (2, 3). The unassigned direct neighbor to the node at coordinated (2, 3) are the nodes at coordinates (2, 2) and (3, 2). However, the signal values of both of these nodes are greater than signal value of the node at coordinate (2, 3). Therefore, neither of these nodes are assigned to the secondary node (2, 3) or touch T1. None of the other secondary nodes have direct neighbor nodes that are not already assigned or that have signals that are less than or equal to the signal value of any of the secondary nodes. Therefore, any unassigned nodes that have a signal value greater than or equal to the threshold signal value are identified.

The nodes at coordinate (3, 2) is identified as a starting or primary node for touch T2. The process described above is repeated with the unassigned nodes for touch T2. Using the process described above nodes at coordinates (1, 2), (2, 1), (2, 2), (2, 3), (3, 1) and (3, 3) are all assigned to the primary node at coordinate (3, 2) and thus touch T2. These are also known as secondary nodes. There are no other unassigned touches on the touch panel shown in FIG. 4B. Table 2 below summarizes the nodes that are assigned to each of the touches T1 and T2. The data shown in Table 2 is output in the form of two contiguous groups of nodes assigned to each touch.

TABLE 2

| Touch | Node coordinates | |
|---|---|---|
| | Primary | Secondary |
| T1 | (2, 4) | (1, 4), (1, 5), (2, 3), (2, 5), (3, 2), (3, 3), (3, 4) |
| T2 | (3, 2) | (1, 2), (2, 1), (2, 2), (2, 3), (3, 1), (3, 3) |

FIG. 5B shows the signal data from FIG. 5A as a two dimensional layout. The numbers in each of the squares in FIG. 5B represent the signal values at each intersection of the x and y conducting lines, i.e. at the sensing nodes. The x and y conducting lines are indicated by the vertical and horizontal dotted lines respectively in FIG. 5B. There are six x-electrodes labeled 0-5 and eight y-electrodes labeled 0-7, the orientation of which are shown towards the top left of the drawing in FIG. 5B The pre-processing step is applied to each of the nodes shown in FIG. 5A. The signal from each of the nodes is compared to a threshold of 13. The nodes having a signal value greater than or equal to 13 are shaded. All the other nodes are assigned to a null touch.

The process described above is applied to the nodes shown in FIG. 5B. Table 3 below summarizes the coordinates that are assigned to three touches T1, T2 and T3.

TABLE 3

| Touch | Node coordinates | |
|---|---|---|
| | Primary | Secondary |
| T1 | (2, 6) | (1, 6), (1, 7), (2, 5), (2, 7), (3, 6) |
| T2 | (0, 1) | (0, 0), (1, 0), (1, 1) |
| T3 | (4, 1) | (4, 2), (5, 1), (5, 2) |

The contiguous groups of nodes from Tables 1, 2 or 3 could be output by the host controller 118, shown in FIG. 2 on an output connection (not illustrated in FIG. 2) to another component for high level processing, for example interpolating the location of each of the touches. Alternatively, the host controller 118 may further process the data for each contiguous groups of nodes as described above to obtain the coordinates for each. The coordinates of each touch is subsequently output on the output for higher level processing or use.

The process described above has been demonstrated by the inventors to prematurely terminate if a large-area touch is detected, for example a hand. This would typically mean that a number of neighboring nodes would have a signal value that may vary within the range of 10%, for example. For example, if the signal value of a direct neighbor node to secondary node is greater than the signal value of the secondary node, the process will terminate, even if the direct neighbor nodes has a signal value that is in the range of 10% of the secondary or primary node. Consequently, the process described above may indicate a smaller touch area than is actually present on the touch panel, if a large-area touch is detected.

Therefore the process described above may be adapted to automatically assign a neighbor node if it has a signal level that is within a certain level of the signal level of the primary starting node, e.g. within 10% or equivalent rounded discrete value. Such a node is assigned to the touch regardless of whether that node satisfies the test of the basic method, i.e. regardless of whether it has a signal less than or equal to the signal on the starting node.

Alternatively, to capture nodes that have signal within the range of 10% of the primary or start node, any neighbor node is automatically assigned to a touch if it has a signal level that is above a saturation threshold. The saturation threshold being set sufficiently low to capture substantially all node signals that are from saturated sensors. This may be considered to be a static threshold setting approach.

The number of touches being sought using the process described above may be capped to a maximum, for example limited to 1, 2, 3 or 4. For example, if none of the higher level processing for gesture detection or other tasks cater for more than, for example, 3 or 4 simultaneous touches, there is no benefit in repeating the method of the invention beyond the fourth touch, since this would be wasted processing. Moreover, the data collection mode can be flexibly varied by varying the fixed number depending on what application, or what part of an application, is being run on the device to which the touch screen provides input. Namely, some applications will only need single touch inputs, whereas others will expect multitouch inputs, often with a fixed maximum number of simultaneous touches.

It will be appreciated that the touch sensor forming the basis for the above described embodiment is an example of a so-called active, or transverse electrode, capacitive sensor. However, the invention is also applicable to so-called passive, or single ended, capacitive sensor arrays. Passive capacitive sensing devices rely on measuring the capacitance of a sensing electrode to a system reference potential (earth). The principles underlying this technique are described in U.S. Pat. No. 5,730,165 and U.S. Pat. No. 6,466,036, for example in the context of discrete (single node) measurements.

Figure 7:
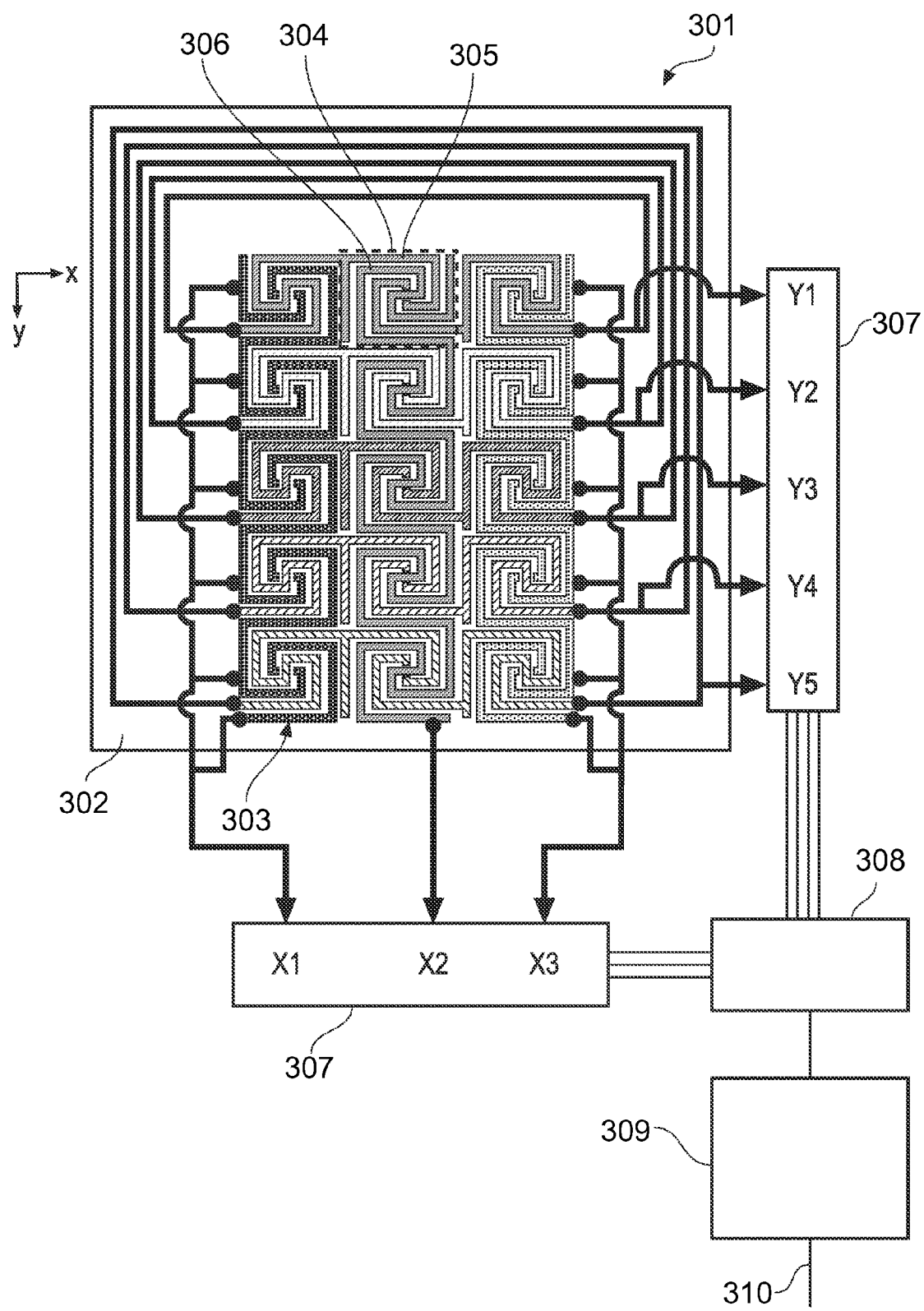
FIG. 7 schematically shows in plan view a 2D touch-sensitive capacitive position sensor and associated hardware of a second embodiment of the invention.

FIG. 7 schematically shows in plan view a 2D touch-sensitive capacitive position sensor 301 and accompanying circuitry according to an passive-type sensor embodiment of the invention.

The 2D touch-sensitive capacitive position sensor 301 is operable to determine the position of objects along a first (x) and a second (y) direction, the orientation of which are shown towards the top left of the drawing. The sensor 301 comprises a substrate 302 having sensing electrodes 303 arranged thereon. The sensing electrodes 303 define a sensing area within which the position of an object (e.g. a finger or stylus) to the sensor may be determined. The substrate 302 is of a transparent plastic material and the electrodes are formed from a transparent film of Indium Tin Oxide (ITO) deposited on the substrate 302 using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

The pattern of the sensing electrodes on the substrate 302 is such as to divide the sensing area into an array (grid) of sensing cells 304 arranged into rows and columns. (It is noted that the terms "row" and "column" are used here to conveniently distinguish between two directions and should not be interpreted to imply either a vertical or a horizontal orientation.) In this position sensor there are three columns of sensing cells aligned with the x-direction and five rows of sensing cells aligned with the y-direction (fifteen sensing cells in total). The top-most row of sensing cells for the orientation shown in FIG. 1 is referred to as row Y1, the next one down as row Y2, and so on down to row Y5. The columns of sensing cells are similarly referred to from left to right as columns X1 to X3.

Each sensing cell includes a row sensing electrode 305 and a column sensing electrode 306. The row sensing electrodes 305 and column sensing electrodes 106 are arranged within each sensing cell 304 to interleave with one another (in this case by squared spiraling around one another), but are not galvanically connected. Because the row and the column sensing electrodes are interleaved (intertwined), an object adjacent to a given sensing cell can provide a significant capacitive coupling to both sensing electrodes irrespective of where in the sensing cell the object is positioned. The characteristic scale of interleaving may be on the order of, or smaller than, the capacitive footprint of the finger, stylus or other actuating object in order to provide the best results. The size and shape of the sensing cell 304 can be comparable to that of the object to be detected or larger (within practical limits).

The row sensing electrodes 305 of all sensing cells in the same row are electrically connected together to form five separate rows of row sensing electrodes. Similarly, the column sensing electrodes 306 of all sensing cells in the same column are electrically connected together to form three separate columns of column sensing electrodes.

The position sensor 301 further comprises a series of capacitance measurement channels 307 coupled to respective ones of the rows of row sensing electrodes and the columns of column sensing electrodes. Each measurement channel is operable to generate a signal indicative of a value of capacitance between the associated column or row of sensing electrodes and a system ground. The capacitance measurement channels 307 are shown in FIG. 1 as two separate banks with one bank coupled to the rows of row sensing electrodes (measurement channels labeled Y1 to Y5) and one bank coupled to the columns of column sensing electrodes (measurement channels labeled X1 to X3). However, it will be appreciated that in practice all of the measurement channel circuitry will most likely be provided in a single unit such as a programmable or application specific integrated circuit. Furthermore, although eight separate measurement channels are shown in FIG. 1, the capacitance measurement channels could alternatively be provided by a single capacitance measurement channel with appropriate multiplexing, although this is not a preferred mode of operation. Moreover, circuitry of the kind described in U.S. Pat. No. 5,463,388 [2] or similar can be used, which drives all the rows and columns with a single oscillator simultaneously in order to propagate a laminar set of sensing fields through the overlying substrate.

The signals indicative of the capacitance values measured by the measurement channels 307 are provided to a processor 308 comprising processing circuitry. The position sensor will be treated as a series of discrete keys or nodes. The position of each discrete key or nodes is the intersection of the x- and y-conducting lines. The processing circuitry is configured to determine which of the discrete keys or nodes has a signal indicative of capacitance associated with it. A host controller 309 is connected to receive the signals output from the processor 308, i.e. signals from each of the discrete keys or nodes indicative of an applied capacitive load. The processed data can then be output by the controller 309 to other systems components on output line 310.

REFERENCES

[1] U.S. Pat. No. 5,825,352
[2] U.S. Pat. No. 5,463,388
[3] US 2006/0097991 A1
[4] U.S. Pat. No. 6,452,514
[5] WO-00/44018
[6] US2008/0246496 A1

What is claimed is:

1. A method comprising:
  accessing, for each sensing node of a plurality of sensing nodes of a touch sensor, a corresponding measured signal value of the sensing node;
  assigning a first sensing node of the plurality of sensing nodes to a first touch based on the corresponding measured signal values of the plurality of sensing nodes, the first sensing node having a maximum corresponding measured signal value among unassigned sensing nodes, the first sensing node being an original start node for the first touch; and
  determining, subsequent to determining that a second sensing node adjacent to the first sensing node should be assigned to the first touch and for each sensing node adjacent to the second sensing node, whether to assign the sensing node to the first touch by applying a logical test using the corresponding measured signal value of the sensing node, the logical test comprising:
    determining whether the corresponding measured signal value of the sensing node is within a percentage range of the corresponding measured signal value of the first sensing node;
    assigning the sensing node to the first touch when the corresponding measured signal value of the sensing node is within the percentage range;
    determining, when the corresponding measured signal value of the sensing node is not within the percentage range, whether the corresponding measured signal value of the sensing node is lower than the corresponding measured signal value of the second sensing node and greater than a minimum detect threshold value; and
    assigning the sensing node to the first touch when the corresponding measured signal value of the sensing node is lower than the corresponding measured signal value of the second sensing node and greater than the minimum detect threshold value.

2. The method of claim 1, further comprising:
  assigning a second sensing node of the plurality of sensing nodes to a second touch; and
  determining, for each sensing node adjacent to the second sensing node, whether to assign the sensing node to the second touch by applying a logical test using the corresponding measured signal value of a sensing node that is adjacent to the second sensing node, the adjacent sensing node being assigned to the second touch when the corresponding measured signal value of the adjacent sensing node is lower than the corresponding measured signal value of the second sensing node.

3. The method of claim 2, further comprising assigning a third sensing node of the plurality of sensing nodes to both the first touch and the second touch.

4. The method of claim 1, comprising, prior to assigning the first sensing node to the first touch, for each of the plurality of sensing nodes:
  determining whether the corresponding measured signal value of the sensing node is less than the minimum detect threshold, and
  assigning, when the corresponding measured signal value of the sensing node is less than the minimum detect threshold, the sensing node to a null touch state such that the sensing node is not considered for assignment to any other touch for an analysis corresponding to a sample interval.

5. The method of claim 1, comprising:
  prior to determining for a particular sensing node that is adjacent to the first sensing node whether to assign the particular sensing node to the first touch, determining whether the corresponding measured signal value of the particular sensing node is less than the minimum detect threshold; and
  assigning, when the corresponding measured signal value of the particular sensing node is less than the minimum detect threshold, the particular sensing node to a null touch state.

6. The method of claim 1, wherein a total number of touches is limited based on an application user interface using the touch sensor.

7. The method of claim 1, wherein the touch sensor comprises a capacitive touch screen.

8. The method of claim 1, wherein:
  the first sensing node and one or more other sensing nodes in the plurality of sensing nodes are assigned to the first touch; and
  the method further comprises summing the measured signal values for each of the sensing nodes assigned to the first touch to quantify a strength of the first touch.

9. A touch sensor, comprising:
  a plurality of sensing nodes;
  a measurement circuit configured to acquire measured signal values from of the plurality of sensing nodes;
  a processor configured to:
    access, for each sensing node of the plurality of sensing nodes, a corresponding measured signal value of the sensing node;
    assign a first sensing node of the plurality of sensing nodes to a first touch based on the corresponding measured signal values of the plurality of sensing nodes, the first sensing node having a maximum corresponding measured signal value among unassigned sensing nodes, the first sensing node being an original start node for the first touch; and
    determine, subsequent to determining that a second sensing node adjacent to the first sensing node should be assigned to the first touch and for each sensing node adjacent to the second sensing node, whether to assign the sensing node to the first touch by applying a logical test using the corresponding measured signal value of the sensing node, the logical test comprising:
      determining whether the corresponding measured signal value of the sensing node is within a percentage range of the corresponding measured signal value of the first sensing node;
      assigning the sensing node to the first touch when the corresponding measured signal value of the sensing node is within the percentage range;
      determining, when the corresponding measured signal value of the sensing node is not within the percentage range, whether the corresponding measured signal value of the sensing node is lower than the corresponding measured signal value of the second sensing node and greater than a minimum detect threshold value; and
      assign the sensing node to the first touch when the corresponding measured signal value of the sensing node is lower than the corresponding measured signal value of the second sensing node and greater than the minimum detect threshold value.

10. The touch sensor of claim 9, wherein the processor is further configured to:
  assign a second sensing node of the plurality of sensing nodes to a second touch; and
  determine, for each sensing node adjacent to the second sensing node, whether to assign the sensing node to the second touch by applying a logical test using the corresponding measured signal value of a sensing node that is adjacent to the second sensing node, the adjacent sensing node being assigned to the second touch when the corresponding measured signal value of the adjacent sensing node is lower than the corresponding measured signal value of the second sensing node.

11. The touch sensor of claim 10, wherein the processor is configured to assign a third sensing node of the plurality of sensing nodes to both the first touch and the second touch.

12. The touch sensor of claim 9, wherein the processor is configured to, prior to assigning the first sensing node to the first touch, for each of the plurality of sensing nodes:
  determine whether the corresponding measured signal value of the sensing node is less than the minimum detect threshold, and
  assign, when the corresponding measured signal value of the sensing node is less than the minimum detect threshold, the sensing node to a null touch state such that the sensing node is not considered for assignment to any other touch for an analysis corresponding to a sample interval.

13. The touch sensor of claim 9, wherein the processor is configured to:
  prior to determining for a particular sensing node that is adjacent to the first sensing node whether to assign the particular sensing node to the first touch, determine whether the corresponding measured signal value of the particular sensing node is less than the minimum detect threshold; and
  assign, when the corresponding measured signal value of the particular sensing node is less than the minimum detect threshold, the particular sensing node to a null touch state.

14. A device, comprising:
  a first processor;
  a touch sensor comprising:
    a plurality of sensing nodes;
    a measurement circuit configured to acquire measured signal values from of the plurality of sensing nodes;
    a second processor configured to:
      access, for each sensing node of the plurality of sensing nodes, a corresponding measured signal value of the sensing node;
      assign a first sensing node of the plurality of sensing nodes to a first touch based on the corresponding measured signal values of the plurality of sensing nodes the first sensing node having a maximum corresponding measured signal value among unassigned sensing nodes, the first sensing node being an original start node for the first touch; and determine, subsequent to determining that a second sensing node adjacent to the first sensing node should be assigned to the first touch and for each sensing node adjacent to the second sensing node, whether to assign the sensing node to the first touch by applying a logical test using the corresponding measured signal value of the sensing node, the logical test comprising:

determining whether the corresponding measured signal value of the sensing node is within a percentage range of the corresponding measured signal value of the first sensing node;

assigning the sensing node to the first touch when the corresponding measured signal value of the sensing node is within the percentage range;

determining, when the corresponding measured signal value of the sensing node is not within the percentage range, whether the corresponding measured signal value of the sensing node is lower than the corresponding measured signal value of the second sensing node and greater than a minimum detect threshold value; and assigning the sensing node to the first touch when the corresponding measured signal value of the sensing node is lower than the corresponding measured signal value of the second sensing node and greater than the minimum detect threshold value.

* * * * *

UNITED STATES PATENT AND TRADEMARK OFFICE
CERTIFICATE OF CORRECTION

| | | |
|---|---|---|
| PATENT NO. | : 8,659,557 B2 | Page 1 of 1 |
| APPLICATION NO. | : 12/255610 | |
| DATED | : February 25, 2014 | |
| INVENTOR(S) | : Martin Simmons et al. | |

It is certified that error appears in the above-identified patent and that said Letters Patent is hereby corrected as shown below:

On the Title Page of the patent: (75) Inventors:

Before "Pickett" delete "David" and insert -- Daniel --.

Signed and Sealed this
Fifteenth Day of September, 2015

Michelle K. Lee
*Director of the United States Patent and Trademark Office*